(12) United States Patent
Weng et al.

(10) Patent No.: US 12,735,202 B1
(45) Date of Patent: Sep. 15, 2026

(54) PASSIVELY RETRACTING PNEUMATIC ACTUATOR

(71) Applicant: Blue Origin LLC, Kent, WA (US)

(72) Inventors: Jeffrey Weng, Newcastle, WA (US); Nicholas B. Greco, Seattle, WA (US)

(73) Assignee: Blue Origin Manufacturing, LLC, Huntsville, AL (US)

( * ) Notice: Subject to any disclaimer, the term of this patent is extended or adjusted under 35 U.S.C. 154(b) by 0 days.

(21) Appl. No.: 18/990,042

(22) Filed: Dec. 20, 2024

(51) Int. Cl.
*B64G 1/64* (2006.01)

(52) U.S. Cl.
CPC .................................. *B64G 1/6459* (2023.08)

(58) Field of Classification Search
CPC .... B64G 1/6459; B64G 1/6455; B64G 1/006; B64G 1/008; F42B 15/38
See application file for complete search history.

(56) References Cited

U.S. PATENT DOCUMENTS

| | | | | |
|---|---|---|---|---|
| 3,045,779 | A * | 7/1962 | Rosenthal | B64G 1/6457 185/37 |
| 10,578,056 | B2 | 3/2020 | Gazave et al. | |
| 11,041,511 | B2 * | 6/2021 | Sybrandy | F16J 15/324 |
| 11,390,398 | B2 * | 7/2022 | Medina | B64G 1/6459 |
| 2015/0159753 | A1 * | 6/2015 | Mueller | F15B 15/1438 92/165 R |

FOREIGN PATENT DOCUMENTS

| | | | | | |
|---|---|---|---|---|---|
| CN | 114719688 | A | | 7/2022 | |
| CN | 114750977 | A | | 7/2022 | |
| CN | 115158709 | A | | 10/2022 | |
| CN | 117232326 | A | | 12/2023 | |
| CN | 118168418 | A | * | 6/2024 | F42B 15/36 |
| EP | 0454545 | A1 | * | 10/1991 | B64G 1/6457 |
| FR | 2712970 | A1 | * | 6/1995 | F41A 1/06 |
| JP | H115600 | A | * | 1/1999 | B64G 1/002 |
| JP | H1111399 | A | * | 1/1999 | B64G 1/641 |
| WO | WO-2025031801 | A1 | * | 2/2025 | B64D 1/02 |

* cited by examiner

*Primary Examiner* — Richard Green
(74) *Attorney, Agent, or Firm* — McCarter & English, LLP; Dave S. Christensen

(57) ABSTRACT

A pneumatic actuator and a vehicle using the pneumatic actuator is provided. The pneumatic actuator may be utilized for separating stages of a vehicle, such as a rocket. The pneumatic actuator includes a pushrod channel having a first gas orifice at a first end and a pushrod slidably received within the pushrod channel. The pushrod defines a receiving space and is movable between a retracted position and an extended position. The pneumatic actuator further includes a pintle body received within the pushrod channel. The pintle body is arranged in fluid communication with at least the first gas orifice and the receiving space. A gas inlet valve is provided at the first gas orifice and a gas supply is fluidly coupled with the gas inlet valve. Gas is supplied to the pushrod channel via the first gas orifice according to a timed pneumatic circuit.

20 Claims, 8 Drawing Sheets

PASSIVELY RETRACTING PNEUMATIC ACTUATOR

BACKGROUND

The subject matter disclosed herein relates in general to multi-stage vehicles, and more particularly to separation actuators for multi-stage space vehicles.

In commercial applications, for example space vehicles such as rockets, shuttles, or the like, include multiple stages. A first stage may include propulsion means such as boosters, rockets, engines, or other thrust elements. In such vehicles, there exists a need to separate propulsion stages from travel or cockpit stages. Typically, separation actuators include complex circuitry, valve operation, springs, or other machinery required to retract the actuator after deployment.

While existing separation actuators are suitable for their intended purposes the need for improvement remains, particularly in actuators having the features described herein.

BRIEF DESCRIPTION

According to one aspect of the present disclosure, a pneumatic actuator is provided. The device includes a housing defining a pushrod channel, the housing comprising a first gas orifice at a first end, a pushrod slidably received within the pushrod channel between a retracted position and an extended position, the pushrod defining a receiving space, and a pintle body received within the pushrod channel. The pintle body may be in fluid communication with at least the first gas orifice and the receiving space. The device may further include a gas inlet valve provided at the first gas orifice and a gas supply fluidly coupled with the gas inlet valve. The gas supply may be configured to supply a gas to the pushrod channel according to a timed pneumatic circuit.

According to another aspect of the present disclosure, a vehicle, such as a space vehicle, rocket, shuttle, or the like, is provided. The vehicle may include a first stage having a propulsion source and a fuel source and a second stage operably coupled to the first stage. The second stage may be configured to selectively separate from the first stage. The vehicle may further include a pneumatic actuator coupled to the first stage. The pneumatic actuator may be configured to selectively push the second stage away from the first stage. The pneumatic actuator may include a housing, a piston received within the housing between a retracted position and an extended position.

A gas supply, such as a pressurized gas supply, may selectively provide pressurized gas to the housing behind the piston to propel the piston from the retracted position to the extended position. One or more apertures may be formed in the piston, in the housing, or in a pintle body positioned within the housing. The gas may selectively bleed or flow through the one or more apertures according to a predetermined pressure or flow rate after the piston is moved to the extended position. A dynamic gas chamber may be formed within the housing. When the gas flows into the dynamic chamber, the piston may be retracted into the housing from the extended position by way of excess pressurized gas within the system.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

Embodiments disclosed herein provide for vehicles, particularly multi-stage vehicles having actuators configured to selectively deploy to separate a first stage from a second stage of the vehicle. For instance, a pneumatic actuator capable of rapid deployment and passive retraction is described herein.

Embodiments described herein include a pneumatic actuator having a housing, a pushrod, a gas supply source, and one or more valves configured to selectively provide pressurized gas to a portion of the pushrod to propel the pushrod from the housing. Further, embodiments described herein include timed pneumatic circuits configured to provide the pressurized gas at a predetermined time together with a plurality of additional connected pneumatic actuators. The times pneumatic circuit may allow for passive retraction without the use of additional circuit logic, springs, valves, or the like.

Historically, separation actuators included each of propulsion or activation means or systems as well as retraction means or systems. By requiring multiple systems for deployment and retraction, additional machinery, parts, logic, and the like are required to separately perform each operation. Often these prior art actuators, when used in an aerospace vehicle (e.g. to separate stages of a rocket), used explosive or destructive assemblies that could only be used once. Since the stages of the rocket were not recovered or reused, the use of a sacrificial component such as an explosive frangible joint was not a concern.

In contrast, embodiments of the present disclosure provide advantages in that an actuator arm or pushrod may be passively retracted after deployment without the use or requirement of additional hardware or software algorithms. For instance, a pushrod may be retracted into a housing using residual gas pressure within the system after deployment (e.g. after separation of stages of a rocket). As will be described, one or more positioned orifices, check valves, and the like may be included to properly distribute the residual pressurized gas after deployment to then retract the pushrod.

Figure 8:
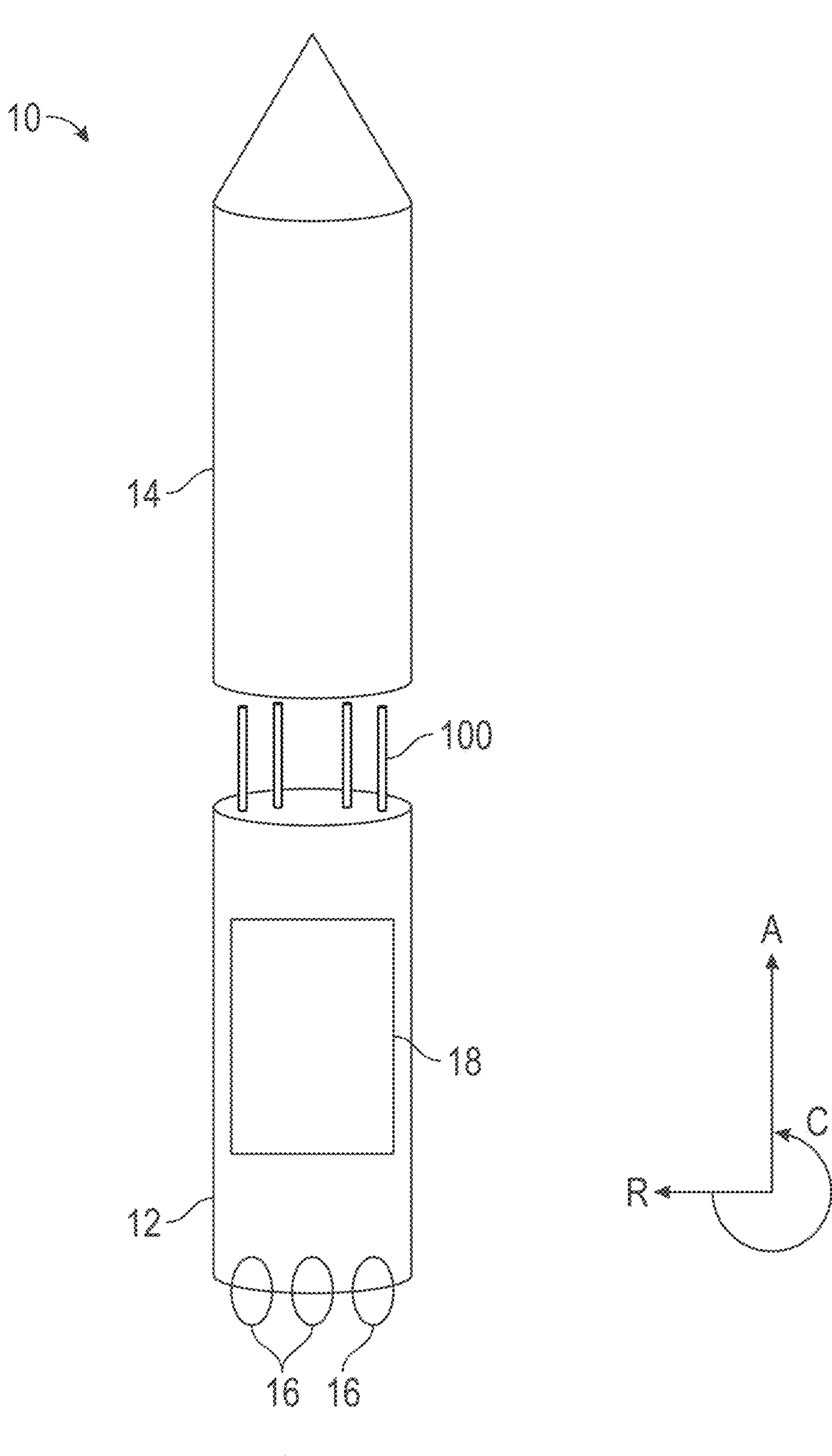
FIG. 8 provides a schematic view of an exemplary vehicle including a pneumatic actuator according to exemplary embodiments of the present disclosure.

Turning now to the figures, a pneumatic actuator 100 according to embodiments will be described. Referring briefly to FIG. 8, pneumatic actuator 100 may be operably coupled with a vehicle 10. Vehicle 10 may be an aerospace or space vehicle, or spacecraft, for example, capable of delivering payloads outside of the atmosphere of Earth. Vehicle 10 may be a rocket that includes multiple stages. For instance, vehicle 10 may include a first stage 12 and a second stage 14. First stage 12 may be operably coupled to second stage 14. First stage 12 may be configured to be selectively separated from second stage 14 (e.g., according to an input).

First stage 12 may include a propulsion source 16. According to some examples, propulsion source 16 includes one or more rockets, engines, or other thrust producing elements capable of propelling vehicle 10. First stage 12 may further include a fuel source 18. For instance, fuel source 18 may be or include one or more fuel tanks storing a consumable fuel. Fuel source 18 may further include a fuel delivery system, such as tubing, conduits, injectors, or the like capable of delivering the fuel to propulsion source 16.

Second stage 14 may be separatably coupled to first stage 12. According to at least some embodiments, second stage 14 may be coupled to first stage 12 via one or more separation systems, such as exploding bolts, magnets, etc. As will be described, one or more actuators (e.g., pneumatic actuator 100) may be included between first stage 12 and second stage 14 to assist or aid in pushing or otherwise urging second stage 14 away from first stage 12 upon disconnection. With brief reference to FIG. 6, multiple pneumatic actuators 100 may be included and spaced equidistant apart from each other about an inner circumference or periphery of vehicle 10 (e.g., contained within vehicle 10). Hereinafter, pneumatic actuator 100 will be described in detail.

Pneumatic actuator 100 may define an axial direction A, a radial direction R, and a circumferential direction C. The coordinate system is provided by way of example only and merely to reference association of parts with each other, and thus it should be acknowledged that pneumatic actuator 100 may be orientated in any suitable direction and within any suitable coordinate system. Additionally or alternatively, the coordinate system described with reference to pneumatic actuator 100 may correspond with a coordinate system of vehicle 10.

Pneumatic actuator 100 may include a housing 102. According to at least some embodiments, housing 102 may be or include a hollow interior or cylinder, such as a piston cylinder for example. Housing 102 may define a pushrod channel 104. For instance, housing 102 may be at least partially hollow. Thus, housing 102 may be configured to accommodate one or more elements therein, as will be described. Further still, housing 102 may be or resemble a shell having an outer housing diameter D1 and an inner housing diameter D2. As would be understood, inner diameter D2 may be less than outer diameter D1.

Housing 102 may include a first gas orifice 106. First gas orifice 106 may be provided or located at a first end 1021 of housing 102. First gas orifice 106 may be configured to allow or permit fluid communication between pushrod channel 104 and an external gas supply (described below). Accordingly, first gas orifice 106 may be an aperture defied through housing 102. As will be described in further detail below, first gas orifice 106 may allow fluid communication with a first portion of pushrod channel 104.

Pneumatic actuator 100 may include a gas inlet valve 108. Gas inlet valve 108 may be operably coupled at first gas orifice 106. For instance, gas inlet valve 108 may be fixed at first gas orifice 106 to selectively allow gas to be introduced into pushrod channel 104. Gas inlet valve 108 may be any suitable valve, such as an electronic valve capable of selectively opening and closing according to input signals. Thus gas inlet valve 108 may be configured to allow one way transfer of gas (e.g., into pushrod channel 104).

Figure 6:
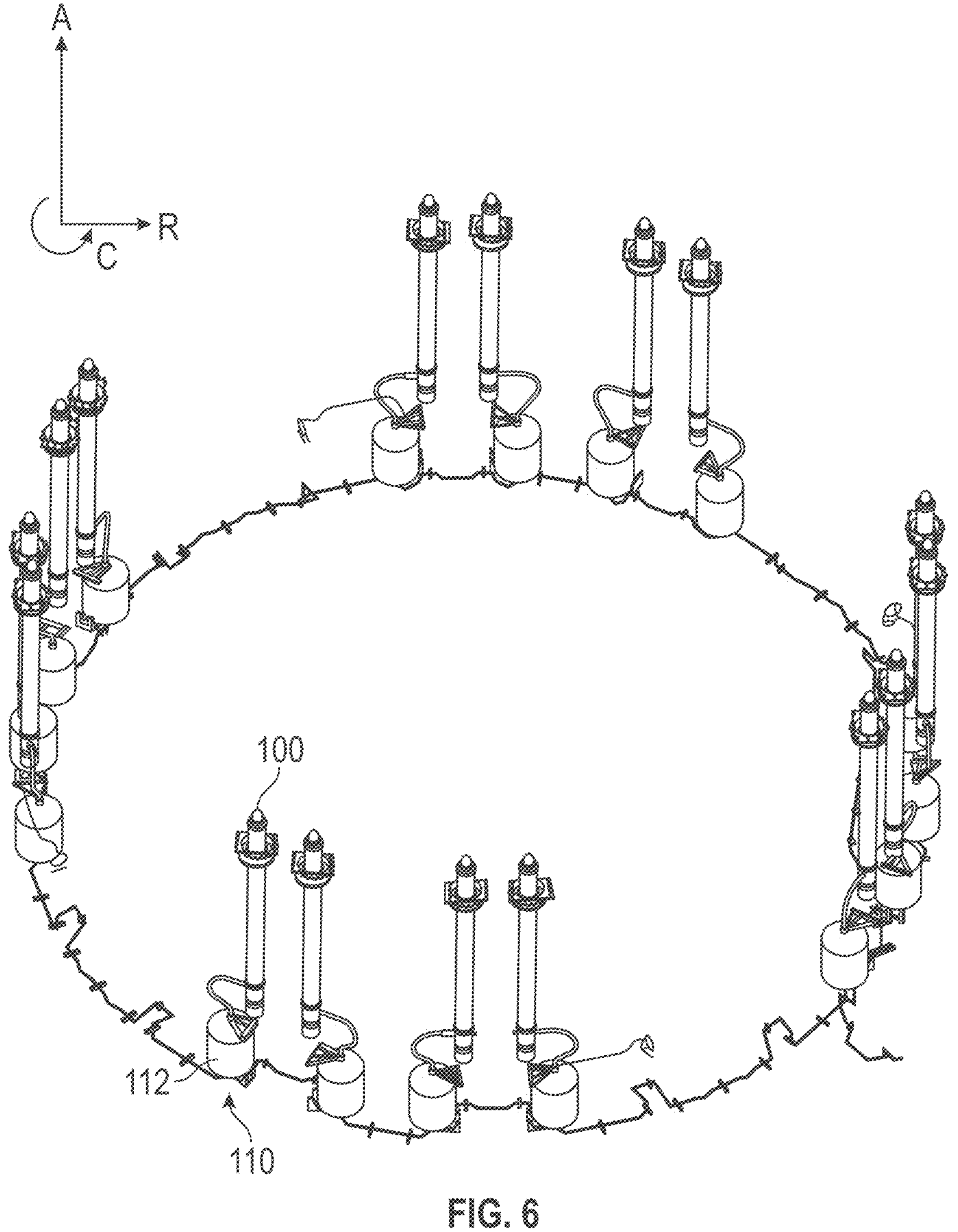
FIG. 6 provides a perspective view of a plurality of exemplary pneumatic actuators in a circular arrangement.

Pneumatic actuator 100 may include a gas supply 110 (FIG. 6). Gas supply 110 may be operably or fluidly coupled with gas inlet valve 108. For instance, gas supply 110 may be provided externally to housing 102. Gas supply 110 may include a tank 112 storing a predetermined amount of gas. According to at least some embodiments, gas supply 110 includes at least a predetermined amount of an inert gas, such as nitrogen for example. Gas supply 110 may include a gas delivery system. For instance, one or more tubes, conduits, nozzles, or the like may be included between tank 112 and gas inlet valve 108. As will be described, gas supply 110 may be configured to supply a gas (e.g., nitrogen) to pushrod channel (e.g., a first portion of pushrod channel 104) according to a timed pneumatic circuit.

Figure 7:
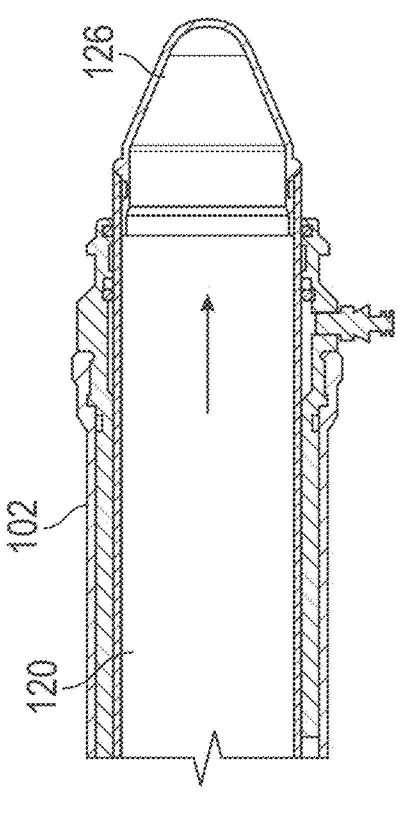
FIG. 7 provides a side cut away view of the exemplary pneumatic actuator of FIG. 1 in a retracted position.
Figure 7:
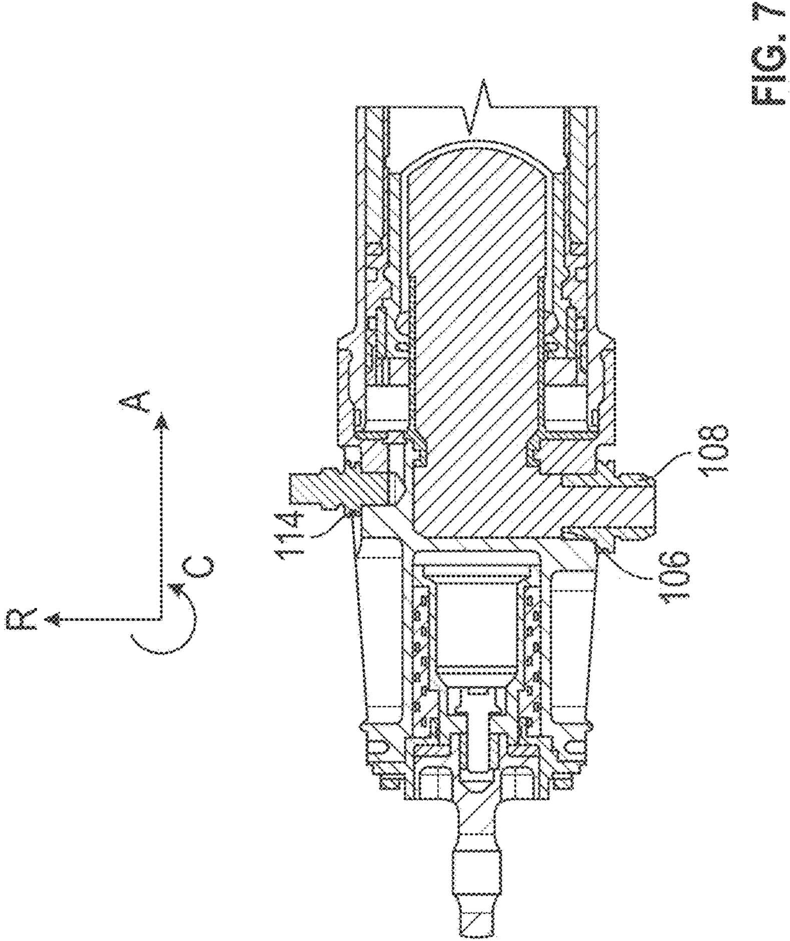

Housing 102 may include a second gas orifice 114 (FIG. 7). Second gas orifice 114 may be provided or located at first end 1021 of housing 102. For instance, second gas orifice 114 may be spaced apart from first gas orifice 106 about the circumferential direction C. In an embodiment, the second gas orifice is positioned diametrically opposite the first gas orifice 106. Second gas orifice 114 may be configured to allow or permit fluid communication between pushrod channel 104 and an external ambient space (e.g., atmosphere, space, etc.). Accordingly, second gas orifice 114 may be an aperture defied through housing 102. As will be described in further detail below, second gas orifice 114 may allow fluid communication with the first portion of pushrod channel 104.

According to at least some embodiments, a valve (or release valve) may be provided at second gas orifice 114. For instance, a check valve, nozzle, or otherwise always open slow leak valve may be provided at or attached at second gas orifice 114. The release valve may selectively permit gas from pushrod channel 104 (e.g., the first portion of pushrod channel 104) to escape to an ambient space external to housing 102. For instance, the release valve may restrict a flow rate of the gas to a predetermined level (e.g., such as a bleed rate or the like) such that the release of the gas from pushrod channel 104 is controlled or limited to provide operational functionality described herein.

As will be explained further below, housing 102 may include an end cap 109 attached or connected at first end 1021 of housing 102. Thus, end cap 109 may axially seal housing 102. In some instances, first gas orifice 106 is defined through end cap 109 (e.g., along the radial direction R). Additionally or alternatively, second gas orifice 108 may be defined through end cap 109 (e.g., along the radial direction R). Accordingly, gas supplied through first gas orifice 106 may expand against end cap 109 to propel a pushrod (described below) along the axial direction A.

Pneumatic actuator 100 may include a pushrod 120. Pushrod 120 may define a first end 1201 and a second end 1202 opposite first end 1201. Second end 1202 may be positioned externally to housing 102 (e.g., such that a portion of pushrod 120 extends axially outward from housing 102). Pushrod 120 may be received within pushrod channel 104. For instance, pushrod 120 may be slidable within pushrod channel 104. Pushrod 120 may be slidable between a retracted position and an extended or deployed position. For instance, when in the retracted position, pushrod 120 may be fully positioned within housing 102 such that first end 1201 is adjacent to first gas orifice 106.

Pushrod 120 may define a receiving space 122. In detail, pushrod 120 may be formed as a hollow tube or tube-like tube or piston elongated along the axial direction A. Pushrod 120 may thus include a main body 124. Main body 124 may define a first end (e.g., first axial end) 1241 and a second end (e.g., second axial end) 1242. First end 1241 may correspond with first end 1201 of pushrod 120 while second end 1242 corresponds with second end 1202 of pushrod 120. Main body 124 may define an outer body diameter D3 and an inner body diameter D4. When inserted into housing 102, an annular gap may be formed between outer body diameter D3 and inner housing diameter D2. Accordingly, outer body diameter D3 may be less than inner housing diameter D2.

Pushrod 120 may include a flange 128. Flange 128 may be formed at first end 1201 of pushrod 120. Flange 128 may extend along the circumferential direction C about main body 124. For instance, flange 128 may define an outer flange diameter D5. Outer flange diameter D5 may be greater than outer body diameter D3. According to at least some embodiments, outer flange diameter D5 is substantially similar to inner housing diameter D2. Accordingly, flange 128 may be configured to be in sliding contact with the inner surface of housing 102. As would be understood, one or more gaskets, rings, seals, or the like may be included at the outer surface of flange 128 to aid in a sealed sliding motion of flange 128 with respect to housing 102.

Flange 128 may define an annular ledge 1281. Annular ledge 1281 may extend along each of the circumferential direction C and the radial direction R. For instance, annular ledge 1281 may be defined between the inner circumferential surface of housing 102 and the outer circumferential surface of pushrod 120. In other words, annular ledge 1281 may connect the outer circumferential surface of flange 128 with the outer circumferential surface of main body 124. Annular ledge 1281 may face toward second end 1202 of pushrod 120. According to at least some embodiments, pneumatic actuator 100 includes a piston ring 129. Piston ring 129 positioned at annular ledge 1281. For instance, piston ring 129 may be in sliding contact with the inner circumferential surface of housing 102. Additionally or alternatively, piston ring 129 may form a seal between main body 124 and housing 102.

As mentioned above, pushrod channel 104 may be divided into two or more portions. In detail, pushrod channel 104 may include a first portion (or supply portion) 1041 and a second portion (or return portion) 1042. Each of first portion 1041 and second portion 1042 may be dynamically sized. For instance, a size or volume of each of first portion 1041 and second portion 1042 may change as pushrod 120 is moved between the retracted position and the deployed or extended position. Thus, a volume of first portion 1041 may be inversely proportional to a volume of second portion 1042.

First portion 1041 may be configured to receive gas (e.g., pressurized gas) from gas supply 110. Accordingly, first portion 1041 may be defined at a rear axial position of pushrod 120. As would be understood, second portion 1042 may be defined at the annular gap between main body 124 and housing 102. First portion 1041 and second portion 1042 may be divided via flange 128. While gas is supplied primarily to first portion 1041, as will be explained further below, the gas may flow at a predetermined controlled rate into second portion 1042.

Flange 128 may include a through aperture 200 formed therein. In some instances, a plurality of through apertures 200 are formed therein (e.g., along the axial direction A). Through aperture 200 may allow fluid communication between first portion 1041 and receiving space 122 of pushrod 120. For instance, through hole 200 may have a predefined cross-section to allow a limited controlled volume of gas to flow from first portion 1041 into receiving space 122 (e.g., after actuation or deployment of pneumatic actuator 100). According to some embodiments, through aperture 200 fluidly connects first portion 1041 with an intermediate chamber 1282 formed between an inner surface of flange 128 and a chamber shell (described below). As will be explained, the gas may then flow at a controlled rate into receiving space 122 before leaking, seeping, or otherwise flowing into second portion 1042 after deployment of pushrod 120.

Pushrod 120 may include a contact tip 126 provided at second end 1242. For instance, contact tip 126 may be a predominantly conical tip fixed to second end 1242 (e.g., by at least one of a fastener, an adhesive, a magnet, a press fit, or the like). Further still, according to at least some embodiments, contact tip 126 may include a buffer, cushion, bumper, or the like attached to an external surface thereof. For instance, contact tip 126 may be configured to push second stage 14 away from first stage 12 of vehicle 10 during a separation process (e.g., when pneumatic actuator 100 is deployed).

Pushrod 120 may include a chamber shell 130. Chamber shell 130 may be formed, provided, or otherwise positioned at first end 1241 of main body 124. For instance, chamber shell 130 may be at least partially received within receiving space 122 of pushrod 120. In detail, chamber shell 130 may be inserted axially into first end 1201 of pushrod 120 (e.g., at flange 128). Chamber shell 130 may define a length along the axial direction A. According to some embodiments, the length of chamber shell 130 is between about 2% and about 4% of a total length of pushrod 120.

Figure 1:
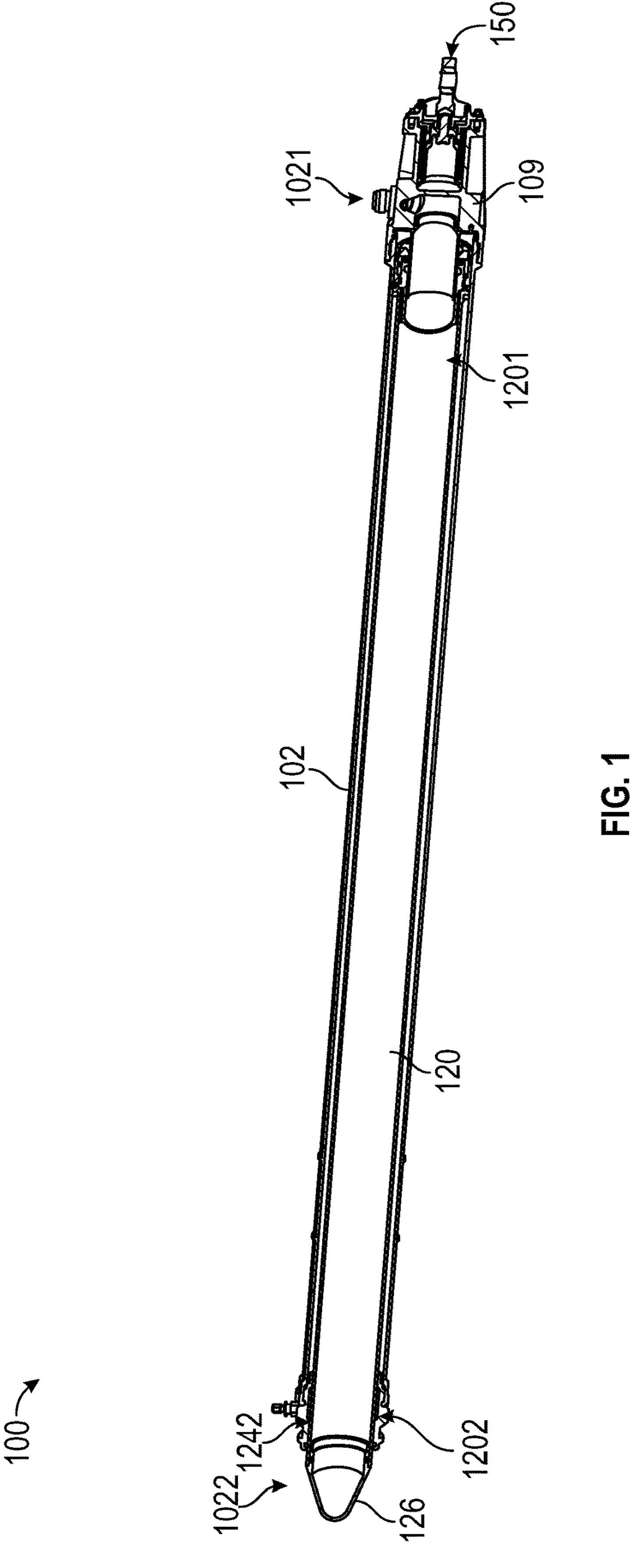
FIG. 1 provides a perspective view of a pneumatic actuator according to exemplary embodiments of the present disclosure.
Figure 2:
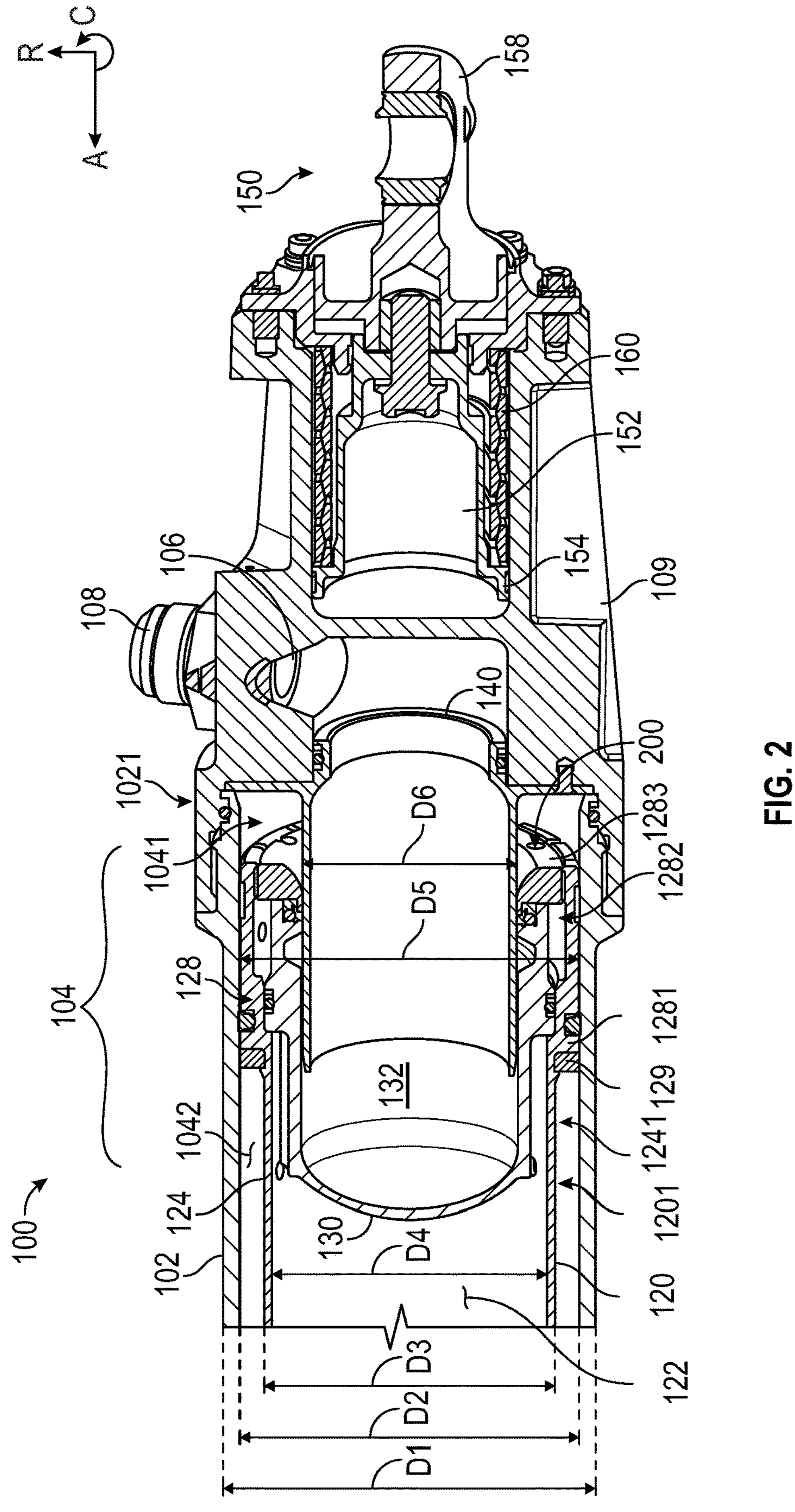
FIG. 2 provides an enlarged section view of a rear portion of the exemplary pneumatic actuator of FIG. 1 at a first angle.
Figure 3:
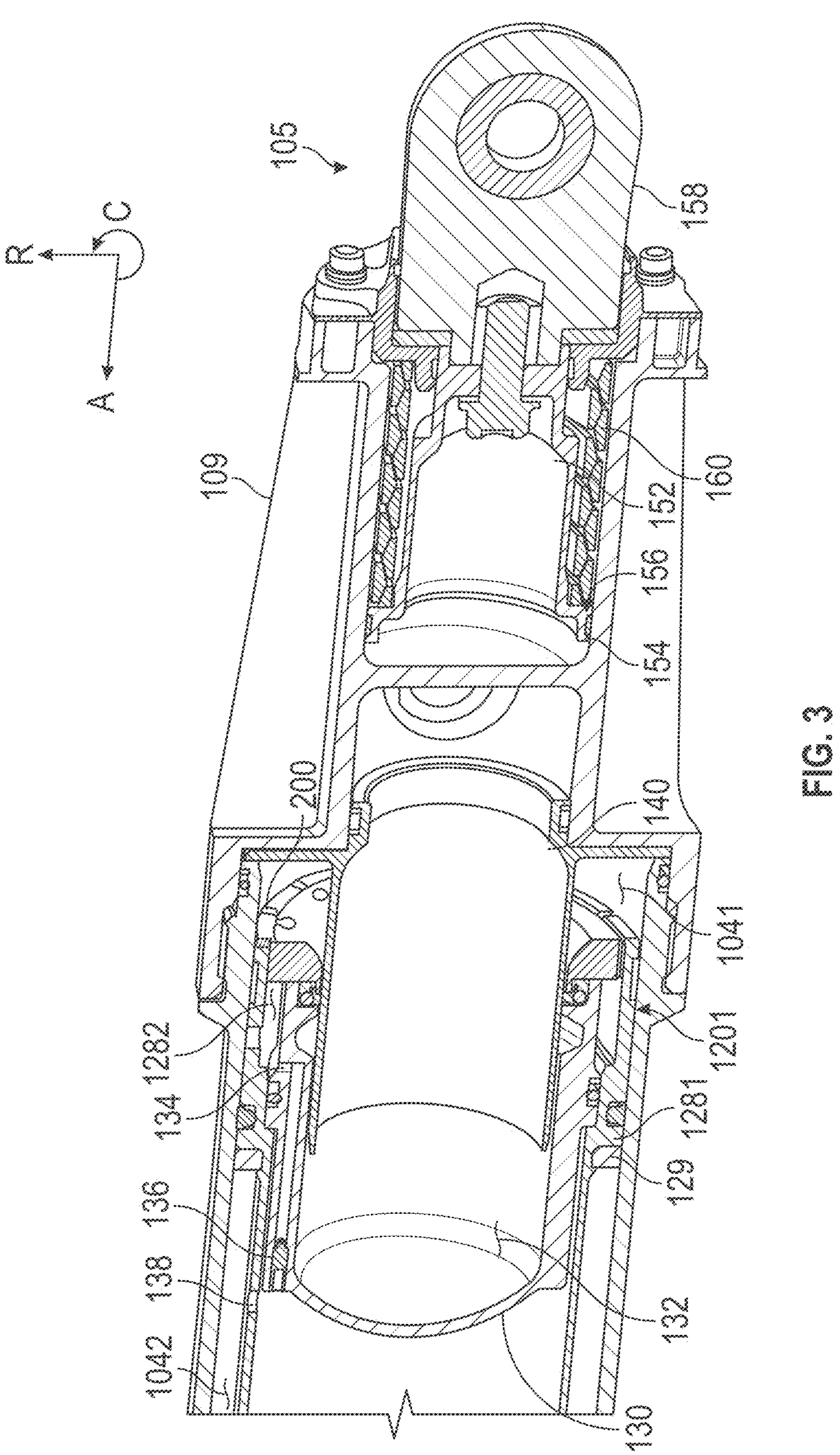
FIG. 3 provides an enlarged section view of the rear portion of the exemplary pneumatic actuator of FIG. 1 at a second angle rotated approximately 90 degrees from FIG. 2.

As shown particularly in FIG. 3, chamber shell 130 may define a chamber receiving space 132. Chamber receiving space 132 may be configured to receive the gas injected/flowed via gas supply 110 (e.g., via gas inlet valve 108). A volume defined within chamber receiving space 132 may be less than a total volume defined within receiving space 122 of pushrod 120. For instance, the volume defined within chamber receiving space 132 may be between about 5% and about 10% of the total volume defined within receiving space 122 of pushrod 120.

Pneumatic actuator 100 may include a pintle body 140. Pintle body 140 may be received within pushrod channel 104. Pintle body 140 may be in fluid communication with first gas orifice 106. Additionally or alternatively, pintle body 140 may be in fluid communication with receiving space 122 of pushrod. In an embodiment, pintle body 140 may be in fluid communication with chamber receiving space 132 of chamber shell 130. For instance, pintle body 140 may include or be formed as a tube-like or tube shaped insert within housing 102. Accordingly, each of a first axial end and a second axial end may be open to allow unfettered gas flow therethrough.

Pintle body 140 may be fixed or attached to end cap 109, for example. Pintle body 140 may include a flange extending along the radial direction R and the circumferential direction C. One or more fasteners may protrude through the flange to secure pintle body 140 to end cap 109 via the flange. Additionally or alternatively, a portion of pintle body 140 (e.g., an inlet portion) may be received within end cap 109. Thus, the inlet portion may be positioned at or near first gas orifice 106.

Pintle body 140 may define a pintle diameter D6. Pintle diameter D6 may be less than inner body diameter D3. For instance, pintle body 140 (e.g., an outlet portion thereof) may be configured to be selectively received within chamber shell 130. In detail, when pushrod 120 is in the retracted position, the outlet portion of pintle body 140 is accepted into chamber receiving space 122 of chamber shell 120. Accordingly, when the pressurized gas from gas supply 110 is supplied through pintle body 140, chamber receiving space 122 may accept a majority of the pressurized gas into first portion 1041 to force pushrod 120 axially outward from housing 102. It should be appreciated that once the flange assembly 128 moves axially beyond the pintle body 140, the pressure will act on the end surface 1283 of the flange assembly 128 increasing, for a predetermined period of time, the axial separation force applied by the pushrod on the body being separated (e.g. the stages of the rocket or spacecraft). Additionally or alternatively, a distal axial annular edge of the outlet portion of pintle body 140 may be tapered. Accordingly, pintle body 140 may be easily received within chamber receiving space 122 when pushrod 120 returns to the retracted position.

Referring still to FIG. 3, chamber shell 130 may include a passageway 134. For instance, passageway 134 may fluidly couple pushrod channel 104 with receiving space 122 of pushrod 120. In detail, passageway 134 may define a first opening fluidly connected to first portion 1041 of pushrod channel 104 (e.g., through intermediate chamber 1282) and a second opening fluidly connected to receiving space 122 of pushrod 120. Accordingly, pressurized gas supplied to first portion 1041 may bleed, leak, or otherwise flow into receiving space 122 via passageway 134.

Passageway 134 may have a predetermined cross-sectional area (e.g., along a flow direction). For instance, the cross-sectional area may be configured to allow the pressurized gas to flow from first portion 1041 into receiving space 122 according to a predetermined rate. The predetermined rate may be determined according to empirical data or testing to control a rate of return of pushrod 120 into housing 102 after deployment. Additionally or alternatively, a plurality of passageways 134 may be formed through chamber shell 130. The plurality of passageways 134 may be spaced about the circumferential direction C around chamber shell 130. Accordingly, any suitable number of passageways 134 may be included according to specific embodiments.

Pneumatic actuator 100 may include a check valve 136. Check valve 136 may be positioned within passageway 134. For instance, check valve 136 may be positioned at a distal end of passageway 134 at or near an outlet to receiving space 122 of pushrod 120. Check valve 136 may be configured to allow or permit a limited flow of gas therethrough. Accordingly, in conjunction with the cross-sectional area of passageway 134, check valve 136 may regulate the flow rate of gas to ensure desired retraction of pushrod 120. As would be understood, a plurality of check valves 136 may be included in the instance of a plurality of passageways 134.

Pushrod 120 may include an aperture 138. Aperture 138 may be defined through main body 124 of pushrod 120 along the radial direction R. Aperture 138 may allow fluid communication between receiving space 122 and pushrod channel 104 (e.g., second portion 1042 of pushrod channel 104). Aperture 138 may have a predetermined size (e.g., diameter, cross-section, length, etc.). For instance, similar to passageway 134, aperture 138 may be sized accordingly to regulate the flow rate of gas from receiving space 122 into second portion 1042 of pushrod channel 104. Additionally or alternatively, a plurality of apertures 138 may be included according to specific embodiments.

Aperture 138 may be positioned at or near chamber shell 120. For instance, aperture may be provided adjacent to the outlet of passageway 134. As mentioned, pushrod 120 is configured to reciprocate between the retracted position and the extended position. When in the extended position, aperture 138 may be positioned so as to fluidly communicate with second portion 1042 of pushrod channel 104. According to at least some embodiments, a distance between aperture 138 and flange 128 is between about 2% and about 5% of a total length of pushrod 120. Thus, aperture 138 may remain in fluid communication with second portion 1042 throughout an entire stroke length of pushrod 120.

As discussed above, pneumatic actuator 100 may be configured to be a passively retracting actuator. In an embodiment, after actuation (e.g., via the pressurized gas), remaining pressure within the system (e.g., within housing 102) may be utilized to retract pushrod 120 into the retracted position. Thus, a first flow path of gas may be defined from gas supply 110 through pintle body 140, into chamber receiving space 132, into first portion 1041 of pushrod channel 104, through flange 128 (e.g., through aperture 200), into passageway 134, through check valve 136, into receiving space 122 of pushrod 120, through aperture 138, and into second portion 1042 of pushrod channel 104. The pressure may accumulate within second portion 1042 such that a pushing force is generated on annular ledge 1281 of flange 128 (e.g., along piston ring 129). As the pressure increases, pushrod 120 may be pushed back into the retracted position using only the remaining pressure within the system, effectively eliminating the need for additional components such as powered valves, springs, additional gas supplies, or the like. In other words, the retraction of the pushrod will occur automatically or passively without additional electrical signals or actions by the operator.

It should be appreciated that the gas supply and orifices described herein are sized to provide desired flow rates during operation to provide desired pressure levels in the respective chambers and receiving areas to allow sufficient force to both separate the stages of a rocket or spacecraft and also cause the retraction of the pushrod within a predetermined time period once the separation has occurred. It should be appreciated that in embodiments such as the separation of stages of a rocket for example, this allows for the retraction of the pushrod within a predetermined period of time, such as before the rocket stage substantially starts a descent through the atmosphere, protecting the pushrod from exposure to undesired temperatures.

Pneumatic actuator 100 may include a connection assembly 150. Connection assembly 150 may be positioned or provided at first end 1021 of housing 102. For instance, connection assembly 150 may be operably connected within end cap 109. Connection assembly 150 may be configured to attach to vehicle 10. For example, connection assembly 150 may be selectively coupled within first stage 12 of vehicle 10.

Connection assembly 150 may include a connector body 152. Connector body 152 may be received within first end 1021 of housing. In some instances, connector body 152 is positioned within end cap 109. Connector body 152 may be predominantly cylindrical in shape. Additionally or alternatively, connector body 152 may include a connector flange 154. Connector flange 154 may extend along the circumferential direction C and the radial direction R from connector body 152. Accordingly, connector flange 154 may define a contact surface 156. Contact surface may face axially outward (e.g., toward first end 1021).

Connection assembly 150 may include a latch ring 158. Latch ring 158 may be coupled to connector body 152. Latch ring 158 may be positioned externally to housing 102. For instance, latch ring 158 may extend axially outward from housing 102. Latch ring 158 may define a loop through with a fastener may be inserted to fix actuator 100 to vehicle 10. Latch ring 158 may be connected to connector body 152 via a fastener, such as a bolt 159. However, it should be understood that any fastening means may be used to couple latch ring 158 to connector body 152.

Connection assembly 150 may include a dampening element 160. Dampening element 160 may be provided or positioned around connector body 152 (e.g., about the circumferential direction C). Dampening element 160 may be configured to bias connector body 152 against housing 102 (e.g., against end cap 109). For instance, dampening element 160 may be positioned between connector flange 154 (e.g., at contact surface 156) and end cap 109 along the axial direction A. Additionally or alternatively, dampening element 160 may be or include an elastic or resilient material capable of deflection. For instance, dampening element 160 may include a rubber material, a spring, a deflector, or the like.

Pneumatic actuator 100 may include a stabilizer 162. Stabilizer 162 may be positioned around housing 102 (e.g., about the circumferential direction C). Accordingly, stabilizer 162 may be provided radially outward from housing 102. Stabilizer 162 may be provided or positioned at or near second end 1022 of housing 102. Stabilizer 162 may act as a contact point to maintain actuator 100 (e.g., housing 102) in a predominantly linear orientation throughout the deployment of pushrod 120 to the extended position. Thus, stabilizer 162 may include an elastic material, such as a rubber or spring. According to some embodiments, stabilizer 162 is configured to restrict a movement or adjustment of housing 102 to within a predetermined percentage of an installed linearity throughout activation.

Figure 4:
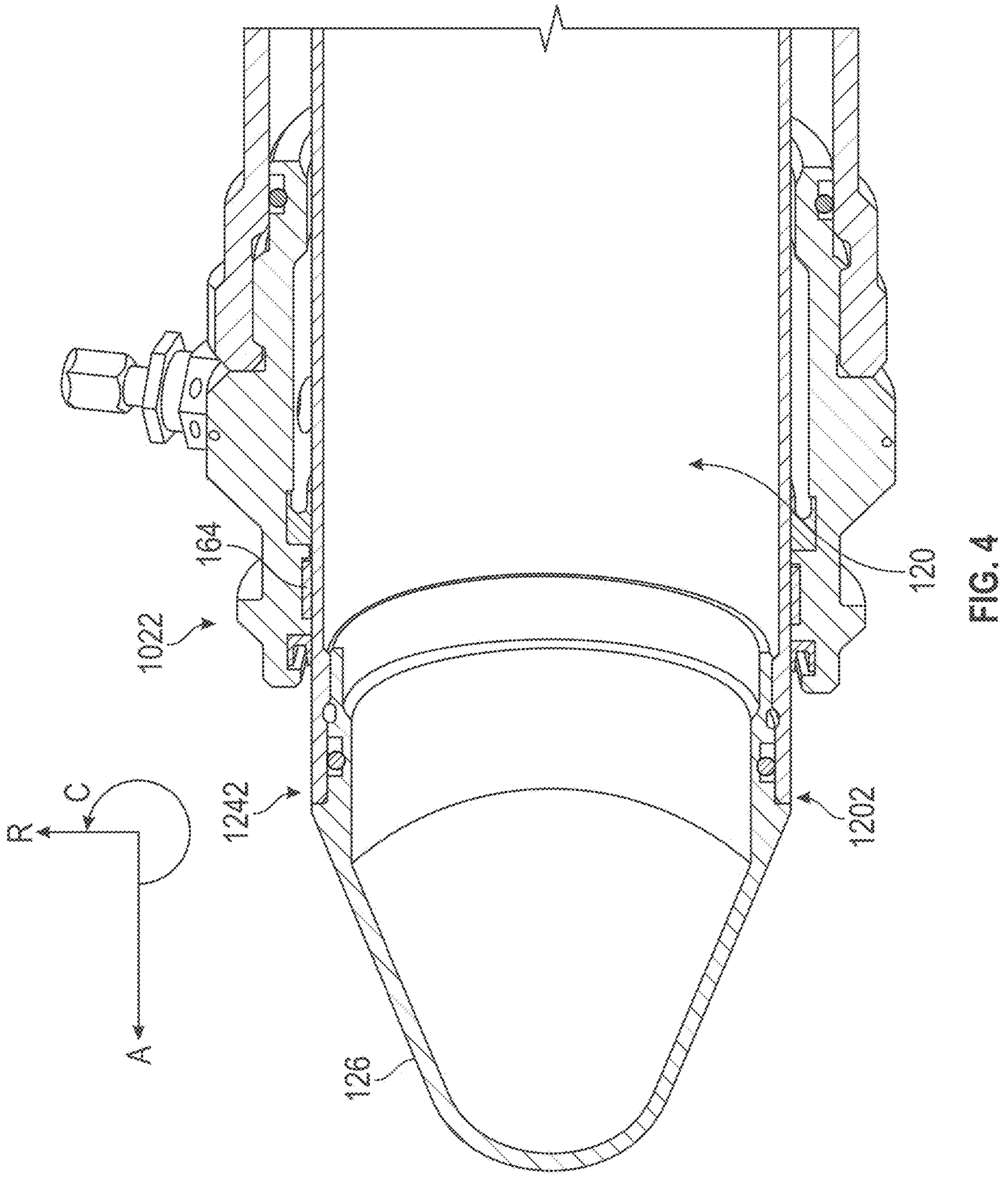
FIG. 4 provides an enlarged section view of a front portion of the exemplary pneumatic actuator of FIG. 1.
Figure 5:
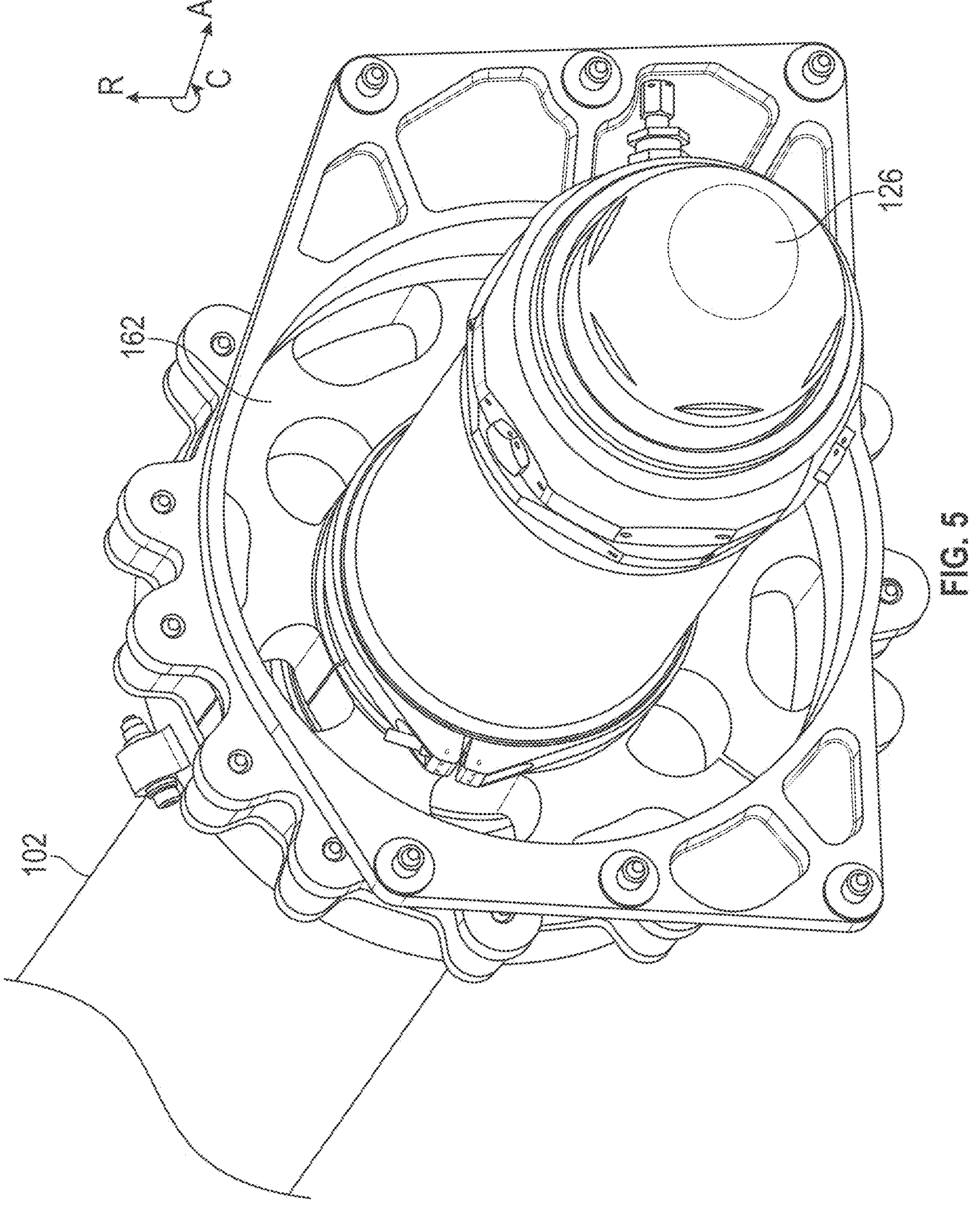
FIG. 5 provides a front perspective view of the exemplary pneumatic actuator of FIG. 1 including an external stabilizer.

Pneumatic actuator 100 may include an electrical grounding ring 164 (FIG. 4). Grounding ring 164 may be accommodated within housing 102. For instance, grounding ring 164 may surround pushrod 120 along the circumferential direction C. Grounding ring 164 may be positioned at or near second end 1022 of housing 102 (e.g., along an internal surface thereof). Grounding ring 164 may be configured to attenuate, absorb, or otherwise deflect electrical disturbances from certain components of actuator 100 (e.g., pushrod 120, gas inlet valve 108, gas supply 110, etc.). Accordingly, grounding ring 164 may be composed of a non-conducting material so as to eliminate the propagation of electrical shock through actuator 100.

The detailed description explains embodiments of the disclosure, together with advantages and features, by way of example with reference to the drawings.

The term "about" is intended to include the degree of error associated with measurement of the particular quantity based upon the equipment available at the time of filing the application.

It should also be noted that the terms "first", "second", "third", "upper", "lower", and the like may be used herein to modify various elements. These modifiers do not imply a spatial, sequential, or hierarchical order to the modified elements unless specifically stated.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description but is only limited by the scope of the appended claims.

What is claimed is:

1. A pneumatic actuator configured to deploy during a separation process of a vehicle, the pneumatic actuator defining an axial direction, a radial direction, and a circumferential direction, the pneumatic actuator comprising:

a housing defining a pushrod channel, the housing comprising a first gas orifice at a first end, the first gas orifice being defined through a sidewall of the housing;

a pushrod slidably received within the pushrod channel between a retracted position and an extended position, the pushrod defining a receiving space;

a pintle body received within the pushrod channel, the pintle body being in fluid communication with at least the first gas orifice and the receiving space, wherein the pintle body is fixed to the housing and the first gas orifice is spaced apart from the pintle body;

a gas inlet valve provided at the first gas orifice; and a gas supply fluidly coupled with the gas inlet valve, the gas supply configured to supply a gas to the pushrod channel according to a timed pneumatic circuit.

2. The pneumatic actuator of claim 1, wherein the pushrod comprises:

a main body defining a first end and a second end;

a chamber shell formed at the first end, the chamber shell being at least partially received within the receiving space of the pushrod and defining a chamber receiving space; and a contact tip provided at the second end.

3. The pneumatic actuator of claim 2, wherein at least a portion of the pintle body is received within the chamber receiving space when the pushrod is in the retracted position.

4. The pneumatic actuator of claim 2, wherein the pushrod further comprises:

a flange formed at the first end of the pushrod, wherein an outer diameter of the flange is greater than an outer diameter of the main body.

5. The pneumatic actuator of claim 4, wherein the flange defines an annular ledge extending along the circumferential direction, the annular ledge being defined between an inner circumferential surface of the housing and an outer circumferential surface of the pushrod.

6. The pneumatic actuator of claim 5, further comprising:

a piston ring positioned at the annular ledge, the piston ring being in sliding contact with the housing.

7. The pneumatic actuator of claim 4, wherein the pushrod comprises at least one aperture defined along the radial direction through the main body, the at least one aperture allowing fluid communication between the pushrod receiving space and the pushrod channel.

8. The pneumatic actuator of claim 7, wherein a distance between the at least one aperture and the flange is between 2% and 5% of a total length of the pushrod.

9. The pneumatic actuator of claim 8, wherein the chamber shell comprises:

at least one passageway fluidly coupling the pushrod channel with the receiving space, wherein the at least one passageway has a predetermined cross-sectional area configured to allow a transfer of gas therethrough according to a predetermined rate.

10. The pneumatic actuator of claim 9, further comprising:

a check valve positioned within the at least one passageway, the check valve configured to allow gas to pass from the pushrod channel into the receiving space.

11. The pneumatic actuator of claim 1, further comprising:

a connection assembly provided at the first end of the housing, the connection assembly configured to connect with a vehicle.

12. The pneumatic actuator of claim 11, wherein the connection assembly comprises:

a connector body received within the first end of the housing along the axial direction, the connector body comprising a connector flange;

a latch ring coupled to the connector body; and a dampening element provided around the connector body along the circumferential direction, the dampening element biasing the connector body against the housing.

13. The pneumatic actuator of claim 12, wherein the housing further comprises:

an end cap coupled to the housing at the first end, wherein the dampening element is positioned between the end cap and the connector flange along the axial direction.

14. The pneumatic actuator of claim 1, further comprising:

a stabilizer provided around the housing along the circumferential direction, the stabilizer being positioned at a second end of the housing opposite the first end.

15. The pneumatic actuator of claim 14, wherein the stabilizer comprises an elastic material.

16. The pneumatic actuator of claim 1, further comprising:

a grounding ring provided around the housing along the circumferential direction, the grounding ring positioned at a second end of the housing opposite the first end.

17. A vehicle comprising:

a first stage, the first stage having a propulsion source and a fuel source;

a second stage operably coupled to the first stage, the second stage being configured to separate from the first stage; and a pneumatic actuator coupled to the first stage, the pneumatic actuator configured to selectively push the second stage away from the first stage, wherein the pneumatic actuator comprises:

a housing defining a pushrod channel, the housing comprising a first gas orifice at a first end;

a pushrod slidably received within the pushrod channel between a retracted position and an extended position, the pushrod defining a receiving space;

a pintle body received within the pushrod channel, the pintle body being in fluid communication with at least the first gas orifice and the receiving space, wherein the pushrod separates from the pintle body when the pushrod is moved to the extended position;

a gas inlet valve provided at the first gas orifice; and a gas supply fluidly coupled with the gas inlet valve, the gas supply configured to supply a gas to the pushrod channel according to a timed pneumatic circuit.

18. The vehicle of claim 17, wherein the pneumatic actuator is a first pneumatic actuator among a plurality of pneumatic actuators, and wherein each of the plurality of pneumatic actuators is connected with a timed pneumatic circuit such that each pneumatic actuator is activated simultaneously.

19. The vehicle of claim 17, wherein the pushrod comprises:

a main body defining a first end and a second end;

a chamber shell formed at the first end, the chamber shell being at least partially received within the receiving space of the pushrod and defining a chamber receiving space; and a contact tip provided at the second end.

20. The vehicle of claim 19, wherein the pushrod comprises at least one aperture defined along the radial direction through the main body, the at least one aperture allowing fluid communication between the pushrod receiving space and the pushrod channel, and wherein the chamber shell comprises at least one passageway fluidly coupling the pushrod channel with the chamber receiving space, wherein the at least one passageway has a predetermined cross-sectional area configured to allow a transfer of gas therethrough according to a predetermined rate.

* * * * *